P. C. WEGO.
CONVEYER ROLLER.
APPLICATION FILED AUG. 14, 1920.

1,425,561.

Patented Aug. 15, 1922.

Inventor:
Peter C. Wego
by: John E. Stryker
his Attorney.

UNITED STATES PATENT OFFICE.

PETER C. WEGO, OF ST. PAUL, MINNESOTA, ASSIGNOR TO STANDARD CONVEYOR COMPANY, A CORPORATION OF MINNESOTA.

CONVEYER ROLLER.

1,425,561.   Specification of Letters Patent.   Patented Aug. 15, 1922.

Application filed August 14, 1920. Serial No. 403,458.

*To all whom it may concern:*

Be it known that I, PETER C. WEGO, a citizen of the United States, residing at St. Paul, in the county of Ramsey and State of Minnesota, have invented new and useful Improvements in Conveyer Rollers, of which the following is a specification.

My invention relates to improvements in conveyer rollers.

Its object is to provide an efficient metallic roller the bearings of which are protected from corrosion, rust and dust.

A further object is to provide novel means for excluding moisture, dust and gases from roller bearings.

The rollers of conveyers usually deteriorate by reason of exposure to moisture, chemicals or dust which affect the bearings. Under such conditions the defective bearings render the conveyer inefficient and makes expensive repairs necessary. I obviate this difficulty and make continuous operation of a conveyer system possible by providing a roller with sealed bearings.

Figure 1:
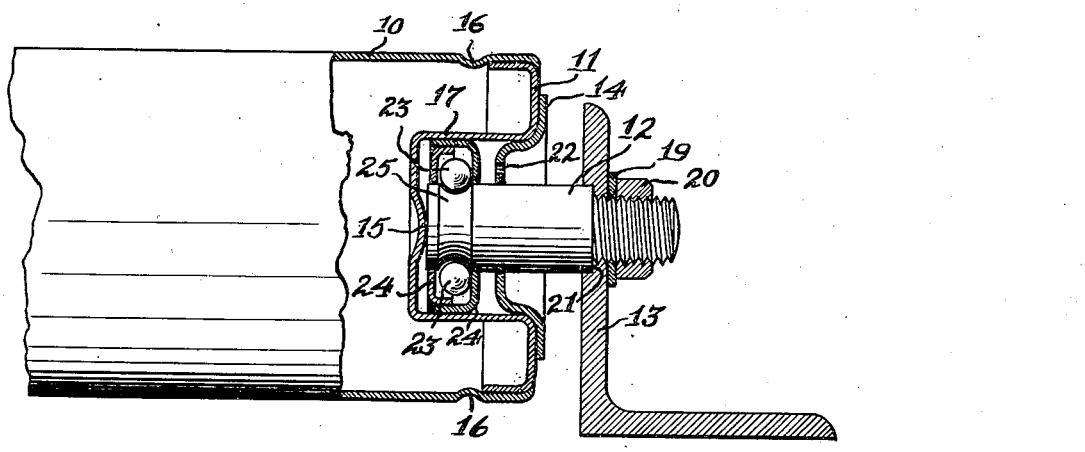
Figure 2:
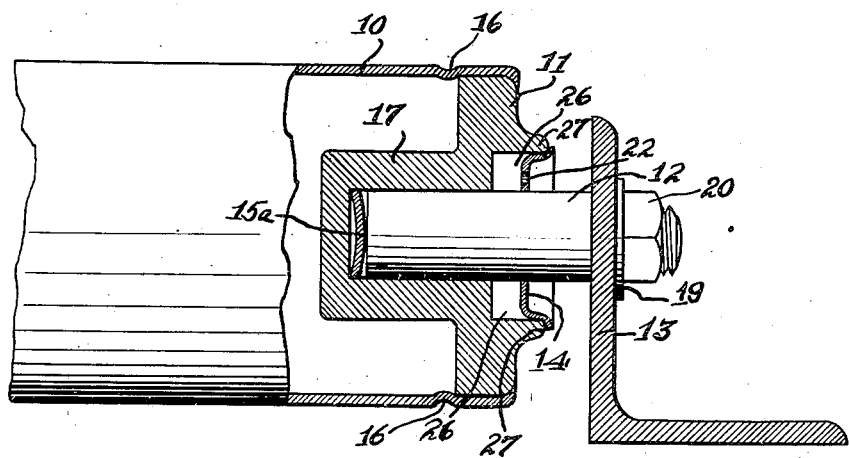

Referring to the accompanying drawings, Figure 1 is an elevation, partially in section, of one end of my improved roller and Fig. 2 is a similar elevation of an alternate construction. The other end of the roller in both embodiments, is identical with that illustrated.

In the drawings I have used the numeral 10 to indicate the body of the roller, 11 is the hub, 12 the axial pintle on which the roller is mounted, 13 the conveyer frame and 14 the grease retaining cap.

The body 10 of the roller as illustrated, is a tube formed near its ends with depressions 16, which serve as stops for the hubs 11 and the ends of said tube are crimped over the ends of the hubs so as to rigidly hold said hubs within the ends of said tube. A cylindrical cup 17 in the center of the hub 11 forms a housing for the bearing proper, the inner axial center of said cup being convex in my preferred construction to give a one point bearing 15 for the end of the pintle 12.

The pintle 12 is rigidly held in the conveyer frame 13 at its outer end which projects through a perforation in the frame 13 to receive a washer 19 and a nut 20, while the inner end of the pintle contacts with the bearing 15. An annular shoulder 21 on the pintle, adjacent to the threaded portion, abuts against the frame 13 when the nut 20 is tightened to bring the washer 19 against the outer surface of said frame. The grease retainer cap 14 is a steel disc pressed into the hub 11 over the cup 17 with an opening in its center for the pintle 12 and a perforation 22 near said opening for the admission of grease to the bearing. The bearing of the roller on the pintle 12 is thus enclosed within the cylindrical cup 17 of the hub 11 by the cap 14, and the cup 17 is deep enough to retain a considerable quantity of grease both around the bearing 15 and immediately inside the cap 14.

An anti-friction bearing is provided in the preferred form of my device consisting of a plurality of balls 23 confined in a cage 24, and a ball race 25 is formed near the inner end of the pintle 12 for the balls 23.

In the alternate embodiment of my device (shown in Fig. 2) I provide the roller with a plain bearing as distinguished from the ball-bearing type shown in my preferred form, and the hubs of the plain bearing roller are made of cast iron instead of steel. Other parts of the two rollers shown are similar with the exception that in the alternate form the thrust bearing 15$^a$ is a steel button, loose in the end of the cup 17, and an annular lip 27 adjacent to the grease space 26 forms a seat for the cap 14.

In use, the space surrounding the bearing and enclosed by the cup 17 and cap 14, is kept filled with grease, the grease being supplied through the perforation 22. This effectually seals the bearing from moisture, chemicals and dust to which it would otherwise be exposed.

Having described my invention what I claim as new and desire to protect by Letters Patent is:

1. In a conveyer roller a body, hubs in the ends of said body, pintles adapted to be rigidly secured at their outer ends in the frame of a conveyer and extending axially into said hubs, bearings for said body on the inner ends of said pintles, caps closing the outer ends of said hubs and annular grease cups between said bearings and caps.

2. In a conveyer roller a body, inwardly extending hubs in the ends of said body, pintles adapted to be rigidly secured at their outer ends in the frame of a conveyer and extending axially into said hubs, bearings for said body near the inner ends of said pintles, caps closing the outer ends of said hubs, and annular grease cups between said caps and bearings, said caps having perforations for the insertion of grease.

3. In a conveyer roller, a body, concave hubs in the ends of said body, pintles adapted to be rigidly secured at their outer ends in the frame of a conveyer and extending axially into said hubs, convex bearings for the inner ends of the pintles formed in the center of the hubs, grease cups in the hubs surrounding said pintles, and caps rigidly mounted in the outer ends of said cups to retain grease therein.

4. In a conveyer roller, a body, inwardly extending hubs in the ends of said body, pintles adapted to be rigidly secured at their outer ends in the frame of a conveyer and extending axially into said hubs, convex bearings, for the inner ends of the pintles, integral with the center of the hub, grease cups in the hubs surrounding said pintles, and caps rigidly mounted in the outer ends of said cups to retain grease therein.

In testimony whereof, I have hereunto signed my name to this specification.

PETER C. WEGO.